US006586564B2

(12) United States Patent
Schäfer et al.

(10) Patent No.: US 6,586,564 B2
(45) Date of Patent: Jul. 1, 2003

(54) DOUBLE-METAL CYANIDE CATALYSTS FOR PREPARING POLYETHER POLYOLS

(75) Inventors: Walter Schäfer, Leichlingen (DE); Jörg Hofmann, Krefeld (DE); Pieter Ooms, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/229,442

(22) Filed: Aug. 28, 2002

(65) Prior Publication Data

US 2003/0050186 A1 Mar. 13, 2003

(30) Foreign Application Priority Data

Aug. 31, 2001 (DE) .......................... 101 42 746

(51) Int. Cl.[7] .......................... C08G 65/00; B01J 27/26; C07D 301/00; C08B 65/26
(52) U.S. Cl. .................. 528/409; 502/175; 502/200; 502/172; 502/150; 528/403; 528/405; 528/408; 528/410; 528/411; 528/412; 528/413; 528/414; 528/415; 528/416; 549/512; 549/513; 549/518; 549/539; 568/617; 568/622; 568/623; 568/624
(58) Field of Search ................. 502/175, 200, 502/150, 172; 528/409, 403, 405, 408, 410, 411, 412, 413, 414, 415, 416; 549/512, 513, 518, 539; 568/617, 622, 623, 624

(56) References Cited

U.S. PATENT DOCUMENTS

| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | ............... 502/175 |
| 5,470,813 A | 11/1995 | Le-Khac | ..................... 502/175 |
| 5,482,908 A | 1/1996 | Le-Khac | ..................... 502/156 |
| 5,536,883 A | 7/1996 | Le-Khac | ..................... 568/620 |
| 5,545,601 A | 8/1996 | Le-Khac | ..................... 502/156 |
| 5,637,673 A | 6/1997 | Le-Khac | ..................... 528/405 |
| 5,712,216 A | 1/1998 | Le-Khac | ..................... 502/175 |
| 5,714,428 A | 2/1998 | Le-Khac | ..................... 502/159 |
| 5,789,626 A | 8/1998 | Le-Khac | ..................... 568/620 |
| 6,018,017 A | 1/2000 | Le-Khac | ..................... 528/421 |
| 6,204,357 B1 | 3/2001 | Ooms et al. | ................ 528/409 |

FOREIGN PATENT DOCUMENTS

| EP | 0 700 949 A2 | 3/1996 |
| EP | 1 029 871 | 8/2000 |
| JP | 4-145123 | 5/1992 |

OTHER PUBLICATIONS

Angew. Chem. 84, No. 1, (month unavailable) 1972, pp. 16–26, Von C.J. Pedersen und H.K. Frensdorff, "Makrocyclische Polyäther und ihre Komplexe".

*Primary Examiner*—Elizabeth Wood
(74) *Attorney, Agent, or Firm*—Joseph C. Gil; Lyndanne M. Whalen; John E. Mrozinski, Jr.

(57) ABSTRACT

The invention relates to double-metal cyanide (DMC) catalysts for preparing polyether polyols by the polyaddition of alkylene oxides on to starter compounds containing active hydrogen atoms, wherein the DMC catalysts are composed of: a) at least one DMC compound; b) at least one organic complexing ligand which is not a coronand; and c) at least one coronand. The DMC catalysts of the present invention have increased activity compared to known catalysts.

9 Claims, No Drawings

DOUBLE-METAL CYANIDE CATALYSTS FOR PREPARING POLYETHER POLYOLS

TECHNICAL FIELD OF THE INVENTION

The present invention relates to double-metal cyanide (DMC) catalysts for preparing polyether polyols by the polyaddition of alkylene oxides on to starter compounds having active hydrogen atoms.

BACKGROUND OF THE INVENTION

DMC catalysts for the polyaddition of alkylene oxides on to starter compounds having active hydrogen atoms are known. See, for example, U.S. Pat. Nos. 3,404,109; 3,829,505; 3,941,849; and 5,158,922. In comparison to polyether polyols prepared with alkali catalysts such as, for example, alkali metal hydroxides, DMC-catalyzed polyether polyols exhibit a reduction in the content of mono-functional polyethers having terminal double bonds, so-called "mono-ols". Polyether polyols prepared with DMC catalysts can be used to produce high-grade polyurethanes such as, for example, elastomers, foams and coatings.

DMC catalysts are typically prepared by reacting an aqueous solution of a metal salt with an aqueous solution of a metal cyanide salt in the presence of an organic complexing ligand, for example, an ether. In a typical DMC catalyst preparation, aqueous solutions of zinc chloride (in excess) and potassium hexacyanocobaltate are mixed together to form a suspension. Dimethoxyethane (glyme) is then added to the suspension. The DMC catalyst is then filtered and washed with an aqueous solution of glyme. A DMC catalyst prepared in this manner can be represented by the general formula

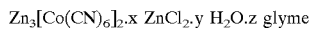

Zn$_3$[Co(CN)$_6$]$_2$.x ZnCl$_2$.y H$_2$O.z glyme

See, for example, EP-A 700 949.

The following references disclose DMC catalysts which use tert-butanol as the organic complexing ligand (by itself or in combination with a polyether) in the preparation of polyether polyols to further reduce mono-ol content: JP 4145123; U.S. Pat. No. 5,470,813; EP 700 949; EP 743 093; EP 761 708; and WO 97/40086. Additionally, the use of these DMC catalysts in the production of polyether polyols reduces the induction time in the polyaddition reaction of alkylene oxides with corresponding starter compounds. Catalytic activity also increases with the use of these DMC catalysts.

There remains, however, a need for DMC catalysts which have increased activity compared to catalysts known in the art which can be used to produce polyether polyols.

SUMMARY OF THE INVENTION

DMC catalysts of the present invention are composed of: a) at least one DMC compound; b) at least one organic complexing ligand which is not a coronand; and c) at least one coronand.

DMC catalysts of the present invention have increased activity compared to catalysts known in the art.

DESCRIPTION OF THE INVENTION

DMC catalysts of the present invention are composed of: a) at least one DMC compound; b) at least one organic complexing ligand which is not a coronand; and c) at least one coronand.

DMC catalysts of the present invention can optionally comprise water, preferably in an amount from 1 to 10 wt. %, based on the total weight of the DMC catalyst. Also, DMC catalysts of the present invention can optionally comprise one or more water-soluble metal salts, preferably in an amount from 5 to 25 wt. %, based on the total weight of the DMC catalyst.

Water-soluble metal salts which can be used in the present invention can be represented by the general formula (I)

$$M(X)_n \quad (I)$$

wherein

M is selected from Zn(II); Fe(II); Ni(II); Mn(II); Co(II); Sn(II); Pb(II); Fe(III); Mo(IV); Mo(VI); Al(III); V(V); V(IV); Sr(II); W(IV); W(VI); Cu(II); and Cr(III) (preferably, Zn(II), Fe(II), Co(II) and Ni(II));

each X is identical or different, preferably identical, and an anion selected from halides, hydroxides, sulfates, carbonates, cyanates, thiocyanates, isocyanates, isothiocyanates, carboxylates, oxalates and nitrates; and n is 1, 2 or 3.

DMC compounds of the present invention are the reaction products of water-soluble metal salts and water-soluble metal cyanide salts or the corresponding acids of the metal cyanide salts. Examples of water-soluble metal salts which can be used to prepare the DMC compounds of the present invention can be represented by the general formula (I), in which M is selected from Zn(II); Fe(II); Ni(II); Mn(II); Co(II); Sn(II); Pb(II); Fe(III); Mo(IV); Mo(VI); Al(III); V(V); V(IV); Sr(II); W(IV); W(VI); Cu(II); and Cr(III) (preferably, Zn(II), Fe(II), Co(II) and Ni(II)). Each X is identical or different, preferably identical, and an anion selected from halides, hydroxides, sulfates, carbonates, cyanates, thiocyanates, isocyanates, isothiocyanates, carboxylates, oxalates and nitrates. The value of n is 1, 2 or 3.

Examples of suitable water-soluble metal salts which can be used in the present invention include zinc chloride; zinc bromide; zinc acetate; zinc acetylacetonate; zinc benzoate; zinc nitrate; iron(II) sulfate; iron(II) bromide; iron(II) chloride; cobalt(II) chloride; cobalt(II) thiocyanate; nickel(II) chloride; and nickel(II) nitrate. Mixtures of water-soluble metal salts can also be used.

Examples of water-soluble metal cyanide salts which can be used to prepare the DMC compounds of the present invention can be represented by the general formula (II)

$$(Y)_a M'(CN)_b (A)_c \quad (II)$$

wherein

M' is selected from Fe(II); Fe(III); Co(II); Co(III); Cr(II); Cr(III); Mn(II); Mn(III); Ir(III); Ni(II); Rh(III); Ru(II); V(IV); and V(V) (Co(II), Co(III), Fe(II), Fe(III), Cr(III), Ir(III) and Ni(II) are preferred) and the water-soluble metal cyanide salt can comprise one or more of these metals;

each Y is identical or different, preferably identical, and is chosen from the group consisting of alkali metal ions and alkaline earth metal ions;

A is identical or different, preferably identical, and is chosen from halides, hydroxides, sulfates, carbonates, cyanates, thiocyanates, isocyanates, isothiocyanates, carboxylates, oxalates and nitrates; and a, and b and c are integers, with the values for a, b and c being chosen so that electroneutrality of the metal cyanide salt is achieved (a is preferably 1, 2, 3 or 4; b is preferably 4, 5 or 6; and c preferably has the value 0).

Examples of water-soluble metal cyanide salts which can be used in the present invention include potassium hexacyanocobaltate(III); potassium hexacyanoferrate(II); potassium hexacyanoferrate(III); calcium (hexacyanocobaltate(III); and lithium hexacyanocobaltate (III).

A preferred DMC compound according to the invention can be represented by the general formula (III)

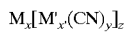 (III)

wherein
M is as defined in formula (I);
M' is as defined in formula (II); and
x, x', y and z are integers and are chosen such that electroneutrality of the DMC compound exists.

Preferably,
x=3, x'=1, y=6 and z=2';
M=Zn(II), Fe(II), Co(II) or Ni(II); and
M'=Co(III), Fe(III), Cr(III) or Ir(III).

Examples of DMC compounds which can be used in the present invention include zinc hexacyanocobaltate(III); zinc hexacyanoiridate(III); zinc hexacyanoferrate(III); and cobalt (II) hexacyanocobaltate(III). Further examples of DMC compounds which can be used in the present invention can be found in, for example, U.S. Pat. No. 5,158,922, the teachings of which are incorporated herein by reference. Zinc hexacyanocobaltate(III) is preferably used in the present invention.

Organic complexing ligands of the present invention are known and described in the following references: U.S. Pat. Nos. 5,470,813; 5,158,922; 3,404,109; 3,829,505; and 3,941,849, the teachings of which are incorporated herein by reference, as well as in EP 700 949; EP 761 708; JP 4145123; EP 743 093; and WO 97/40086. Preferably, organic complexing ligands of the present invention are water-soluble organic compounds having heteroatoms such as oxygen, nitrogen, phosphorus or sulfur which are able to form complexes with the DMC compound. Examples of organic complexing ligands which can be used in the present invention include, for example, alcohols; aldehydes; ketones; ethers; esters; amides; ureas; nitriles; sulfides and mixtures thereof. Preferred organic complexing ligands are water-soluble aliphatic alcohols such as ethanol; isopropanol; n-butanol; iso-butanol; sec.-butanol; and tert.-butanol. Tert.-butanol is particularly preferred.

Suitable coronands which can be used in the present invention include monocyclic crown compounds such as crown ethers; crown ethers substituted with heteroatoms (for example, aza-coronands, thia-coronands or phospha-coronands); spherands; cycles which are composed of heteroaromatic building blocks such as furans, thiophenes or pyridines (for example, the sexipyridines); and cycles which are composed of keto groups, carboxylic acid ester groups or carboxylic acid amide groups as donor sites in the ring (for example, nonactin or valinomycin). Preferably, crown ethers are used. More preferably, crown ethers are used which have a ring system comprising from 3 to 20 oxygen atoms, with two adjacent oxygen atoms in each case being linked by a bridge 2 to 6 carbon atoms in length. Aliphatic or aromatic rings may be condensed on to the central ring system of the crown ether. The crown ethers may have functional groups such as amino groups, hydroxy groups, carboxy groups or nitro groups.

Examples of un-substituted crown ethers include [12]-crown-4 (1,4,7,10-tetraoxacyclododecane); [15]-crown-5 (1,4,7,10,13-pentaoxacyclopenta-decane); [18]-crown-6 (1,4,7,10,13,16-hexaoxacyclooctadecane); [21]-crown-7 (1,4,7,10,13,16,19-heptaoxacyclohenicosane); and [24]-crown-8 (1,4,7,10,13,16,19,22-octaoxacyclotetracosane). Examples of crown ethers having ring systems condensed on to the central ring system include benzo[15]-crown-5; dibenzo[18]-crown-6; dicyclohexano[18]-crown-6; and dibenzo[30]-crown-10. Examples of crown ethers having additional functional groups include 2-hydroxymethyl[12]-crown-4; 2-hydroxymethyl[18]-crown-6; [18]-crown-6-2,3, 11,12-tetracarboxylic acid; 4-amino-dibenzo[18]-crown-6; 2-aminomethyl[15]-crown-5; 4-formylbenzo[15]-crown-5; 4-nitro-benzo[18]-crown-6; and perfluoro[15]-crown-5. Further examples can be found in 89 *J. Chem. Soc.*, p. 7017 (1967); 84 *Angew. Chem.* p. 16 (1972); and Gokel et al., *Macrocyclic Polyether Synthesis*, (1982).

The amount of DMC compounds present in the DMC catalyst can be from 20 to 90 wt. %, preferably, from 25 to 80 wt. %, based on the total weight of the DMC catalyst. The amount of organic complexing ligands present in the DMC catalyst can be from 0.5 to 30 wt. %, preferably, from 1 to 25 wt. %, based on the total weight of the DMC catalyst. The amount of coronands present in the DMC catalyst can be from 1 to 80 wt. %, preferably, from 1 to 40 wt. %, based on the total weight of the DMC catalyst.

DMC catalysts of the present invention can be analyzed by elemental analysis, thermogravimetric analysis or extractive removal of the ionic surface-active or interface-active compound content followed by gravimetric determination.

DMC catalysts according to the invention can be crystalline, partially crystalline or amorphous. Crystallinity is typically analyzed by powder X-ray diffractometry.

DMC catalysts of the present invention preferably comprise zinc hexacyanocobaltate(III), tert.-butanol and coronand DMC catalysts of the present invention are typically prepared in aqueous solution by reacting at least one metal salt (preferably represented by the general formula (I)), with at least one metal cyanide salt (preferably represented by the general formula (II)), in the presence of at least one organic complexing ligand (which is not a coronand) and at least one coronand.

In this preparation, in an aqueous solution, the metal salt (for example, zinc chloride, employed in a stoichiometric excess (at least 50 mol. %, based on the molar amount of metal cyanide salt) is reacted with the metal cyanide salt (for example, potassium hexacyanocobaltate) in the presence of the organic complexing ligand (for example, tert-butanol). A suspension comprising the DMC catalyst (for example, zinc hexacyanocobaltate), water, excess metal salt and the organic complexing ligand is formed.

The organic complexing ligand is either present in the aqueous solution of the metal salt and/or the metal cyanide salt or is added directly to the suspension after precipitation of the DMC catalyst. The organic complexing ligand is typically used in excess. Preferably, the mixture of aqueous solution and organic complexing ligand is stirred vigorously. The suspension formed is typically treated with coronands. Coronands are preferably used in a mixture with water and organic complexing ligand.

The DMC catalyst is isolated from the suspension by known techniques such as centrifugation or filtration. In a preferred embodiment of the present invention, the isolated DMC catalyst is washed with an aqueous solution of the organic complexing ligand (for example, by re-suspension and then renewed isolation by filtration or centrifugation). Water-soluble by-products, for example, potassium chloride, are removed from the isolated DMC catalyst by washing with an aqueous solution of the organic complexing ligand.

The amount of organic complexing ligand in the aqueous wash solution is preferably between 20 and 80 wt. %, based on the total weight of the aqueous wash solution. It is advantageous to add coronands to the aqueous wash solution. Preferably, the amount of coronands present in the aqueous wash solution is from 0.5 to 5 wt. %, based on the total weight of the aqueous wash solution.

Preferably, the DMC catalyst is washed more than once. This can be accomplished by repeating the aqueous wash solution procedure described above. However, the use of a non-aqueous wash solution for further washing operations is preferred. The non-aqueous wash solution comprises a mixture of organic complexing ligands and coronands.

The washed DMC catalyst is then dried, optionally, after pulverization, at a temperature between 20–100° C. and under a pressure of between 0.1 mbar to normal pressure (1,013 mbar).

The present invention also relates to the preparation of polyether polyols by the polyaddition of alkylene oxides on to starter compounds having active hydrogen atoms in the presence of the DMC catalysts of the present invention.

Examples of alkylene oxides which can be used in the present invention include ethylene oxide, propylene oxide, butylene oxide and mixtures thereof. The build-up of the polyether chains by alkoxylation can be accomplished by using only one monomeric epoxide, or randomly or blockwise with 2 or 3 different monomeric epoxides. Further details in this regard can be found in *Ullmanns Encyclopädie der industriellen Chemie*, Volume A21, 1992, p. 670 et seq.

Starter compounds containing active hydrogen atoms which are preferably used in the present invention are compounds with number average molecular weights of 18 to 2,000 with 1 to 8 hydroxyl groups. Examples of starter compounds useful in the present invention include ethylene glycol; diethylene glycol; triethylene glycol; 1,2-propylene glycol; 1,4-butanediol; hexamethylene glycol; bisphenol A; trimethylolpropane; glycerol; pentaerythritol; sorbitol; sucrose; degraded starch and water.

Starter compounds having active hydrogen atoms, such as have been prepared, for example, by conventional alkali catalysis from the aforementioned low molecular weight starters and which are oligomeric alkoxylation products having number average molecular weights of from 200 to 2,000 are preferable used.

The polyaddition of alkylene oxides on to starter compounds having active hydrogen atoms, catalyzed by the DMC catalysts of the present invention, is typically carried out at temperatures of from 20 to 200° C., preferably, from 40 to 180° C., more preferably, from 50 to 150° C. The reaction can be carried out at total pressures of from 0.0001 to 20 bar. The polyaddition can be carried out in bulk or an inert organic solvent, such as toluene and/or tetrahydrofuran (THF). The amount of solvent used is typically from 10 to 30 wt. %, based on the total weight of polyether polyol to be prepared.

The DMC catalyst concentration is chosen such that sufficient control of the polyaddition reaction is possible under the given reaction conditions. The catalyst concentration is typically in the range of from 0.0005 wt. % to 1 wt. %, preferably, 0.001 wt. % to 0.1 wt. %, more preferably, 0.001 to 0.0025 wt. %, based on the total weight of the polyether polyol to be prepared.

The number average molecular weight of the polyether polyol prepared by the process of the present invention is in the range of from 500 to 100,000 g/mol, preferably, 1,000 to 50,000 g/mol, more preferably, 2,000 to 20,000 g/mol.

The polyaddition can be carried out continuously or discontinuously, (e.g. in a batch or in semi-batch process).

Due to their increased activity, the DMC catalysts of the present invention can be used in low concentrations (25 ppm and less, based on the amount of the polyether polyol to be prepared). In the preparation of polyurethanes, if a polyether polyol is prepared in the presence of the DMC catalyst according to the present invention, the step of removing the DMC catalyst from the polyether polyol can be omitted without adversely affecting the product quality of the resulting polyurethane. See Kunststoffhandbuch, Vol. 7, *Polyurethane*, 3rd Ed. 1993, p.25–32 and 57–67.

The following examples merely illustrate the invention. Those skilled in the art will recognize many variations that are within the spirit of the invention and scope of the claims.

EXAMPLES

Example 1

Preparation of a DMC Catalyst Comprising cis-dicyclohexano[18]-crown-6

9 ml of an aqueous 7.4 wt. % potassium hexacyanocobaltate solution was added, with vigorous stirring, to a mixture of 15 ml of an aqueous 11.8 wt. % zinc chloride solution, 13 ml tert.-butanol and 0.4 g cis-dicyclohexano[18]-crown-6. The precipitate which formed was washed with a mixture of 10 ml tert.-butanol and 30 ml water and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=12.9 wt. %; zinc=25.7 wt. %; tert.-butanol=6.0 wt. %; cis-dicyclohexano[18]-crown-6=14.6 wt. %.

Example 2

Preparation of a DMC Catalyst Comprising cis-dicyclohexano[18]-crown-6

9 ml of an aqueous 7.4 wt. % potassium hexacyanocobaltate solution was added, with vigorous stirring, to a mixture of 15 ml of an aqueous 11.8 wt. % zinc chloride solution, 13 ml tert.-butanol, 1 ml 12 wt. % ethanoic acid and 0.4 g cis-dicyclohexano[18]-crown-6. The precipitate which formed was washed with a mixture of 10 ml tert.-butanol and 30 ml water and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=10.4 wt. %; zinc=25.3 wt. %; tert.-butanol=4.8 wt. %; cis-dicyclohexano[18]-crown-6=24.2 wt. %.

Example 3

Preparation of a DMC Catalyst Comprising cis-dicyclohexano[18]-crown-6

26.1 ml of an aqueous 1.84 wt. % hexacyanocobalt acid solution was added, with vigorous stirring, to a mixture of 15 ml of an aqueous 11.8 wt. % zinc chloride solution, 13 ml tert.-butanol, 1 ml 12 wt. % ethanoic acid and 0.4 g cis-dicyclohexano[18]-crown-6. The precipitate which formed was washed with a mixture of 10 ml tert.-butanol and 30 ml water and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=10.5 wt. %; zinc=19.7 wt. %; tert.-butanol=4.9 wt. %; cis-dicyclohexano[18]-crown-6=15.2 wt. %.

Example 4

DMC Catalyst Comprising cis-dicyclohexano[24]-crown-8

6 ml of an aqueous 7.4 wt. % potassium hexacyanocobaltate solution and 5 ml of an aqueous 4.8 wt. % potassium hexacyanoferrate(III) solution were added, with vigorous stirring, to a mixture of 15 ml of an aqueous 11.8 wt. % zinc chloride solution, 13 ml tert.-butanol and 0.4 g cis-dicyclohexano[24]-crown-8. The precipitate which formed was washed with a mixture of 10 ml tert.-butanol and 30 ml water and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=7.3 wt. %; iron=3.7 wt. %; zinc=25.5 wt. %; tert.-butanol=5.2 wt. %; cis-dicyclohexano[24]-crown-8=21.7 wt. %.

Example 5

DMC Catalyst Comprising cis-dicyclohexano[18]-crown-6

4.5 ml of an aqueous 7.4 wt. % potassium hexacyanocobaltate solution and 5 ml of an aqueous 7.2 wt. % potassium hexacyanoferrate(III) solution were added, with vigorous stirring, to a mixture of 15 ml of an aqueous 11.8 wt. % zinc chloride solution, 13 ml tert.-butanol and 0.4 g cis-dicyclohexano[18]-crown-6. The precipitate which formed was washed with 30 ml water and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=6.2 wt. %; zinc=25.9 wt. %; iron=5.9 wt. %; tert.-butanol=5.9 wt. %; cis-dicyclohexano[18]-crown-6=16.7 wt. %.

Example 6

Preparation of a DMC Catalyst Comprising [18]-crown-6

9 ml of an aqueous 7.4 wt. % potassium hexacyanocobaltate solution was added, with vigorous stirring, to a mixture of 28 ml of an aqueous 12.7 wt. % zinc chloride solution, 13 ml tert.-butanol, 1 ml 12 wt. % ethanoic acid and 0.4 g [18]-crown-6. The precipitate which formed was washed with 30 ml water and was filtered off. 20 ml tert.-butanol was then added to the filter residue which was filtered again. Following filtration, the catalyst was dried at 100° C. at reduced pressure (10 mbar) to constant weight.

Elemental analysis, thermogravimetric analysis and extraction: cobalt=11.0 wt. %; zinc=26.2 wt. %; tert.-butanol=6.2 wt. %; [18]-crown-6=15.1 wt. %.

Example 7

Preparation of a DMC Catalyst Comprising [15]-crown-5

27 ml of an aqueous 1.79 wt. % hexacyanocobalte acid solution was added, with vigorous stirring, to a mixture of 28 ml of an aqueous 12.7 wt. % zinc chloride solution, 13 ml tert.-butanol, 1 ml 12 wt. % ethanoic acid and 0.4 g [15]-crown-5. The precipitate which formed was washed with 30 ml water and was filtered off. 20 ml tert.-butanol was then added to the filter residue which was filtered again. Following filtration, the catalyst was dried at 100° C. at reduced pressure (10 mbar) to constant weight.

Elemental analysis, thermogravimetric analysis and extraction: cobalt=10.7 wt. %; zinc=23.3 wt. %; tert.-butanol=5.0 wt. %; [15]-crown-5=11.4wt. %.

Example 8

Preparation of a DMC Catalyst Comprising 2-hydroxymethyl[18]-crown-6

9 ml of an aqueous 7.4 wt. % potassium hexacyanocobaltate solution was added, with vigorous stirring, to a mixture of 14 ml of an aqueous 12.7 wt. % zinc chloride solution, 13 ml tert.-butanol and 0.4 g 2-hydroxymethyl[18]-crown-6. The precipitate which formed was washed with 30 ml water and was filtered off. 20 ml tert.-butanol was then added to the filter residue which was filtered again. Following filtration, the catalyst was dried at 100° C. at reduced pressure (10 mbar) to constant weight.

Elemental analysis, thermogravimetric analysis and extraction: cobalt=10.4 wt. %; zinc=24.7 wt. %; tert.-butanol=5.8 wt. %; 2-hydroxymethyl[18]-crown-6=12.4 wt. %.

Example 9

DMC Catalyst Comprising 2-hydroxymethyl[18]-crown-6

27 ml of an aqueous 1.79 wt. % hexacyanocobalte acid solution was added, with vigorous stirring, to a mixture of 14 ml of an aqueous 12.7 wt. % zinc chloride solution, 13 ml tert.-butanol, 1 ml 12 wt. % ethanoic acid and 0.4 g 2-hydroxymethyl[18]-crown-6. The precipitate which formed was washed with 30 ml water and was filtered off. 20 ml tert.-butanol was then added to the filter residue which was filtered again. Following filtration, the catalyst was dried at 100° C. at reduced pressure (10 mbar) to constant weight.

Elemental analysis, thermogravimetric analysis and extraction: cobalt=10.1 wt. %; zinc=20.2 wt. %; tert.-butanol=4.2 wt. %; 2-hydroxymethyl[18]-crown-6=13.4 wt. %.

Comparative Example 10

Preparation of a DMC Catalyst Which Does Not Comprise a Coronand 9 ml of an aqueous 7.4 wt. % potassium hexacyanocobaltate solution was added, with vigorous stirring, to a mixture of 15 ml of an aqueous 11.8 wt. % zinc chloride solution and 13 ml tert.-butanol. The precipitate which formed was washed with 10 ml tert.-butanol and was filtered off. 20 ml tert.-butanol was then added to the filter residue which was filtered again. Following filtration, the catalyst was dried at 50° C. at reduced pressure (10 mbar) to constant weight.

Elemental analysis, thermogravimetric analysis and extraction: cobalt=15.7 wt. %; zinc=27.8 wt. %; tert.-butanol=7.9 wt %.

Preparation of Polyether Polyols

General Method

To determine the activity of the catalysts prepared in the present invention, 50 g polypropylene glycol starter (molecular weight=1000 g/mol) and 20 mg catalyst were introduced under protective gas (argon) into a 500 ml pressure reactor and heated to 130° C. while stirring.

Within 30 minutes, a maximum of 50 g propylene oxide was dispensed-in at a pressure of 2.5 bar. After 30 minutes, the reaction mixture was cooled to room temperature and propylene oxide was removed by purging with argon.

The product was characterized by a molecular weight distribution (weight average) determined by gel permeation chromatography (GPC).

The results which were obtained are illustrated in Table 1.

TABLE 1

Molecular Weight Distribution of the Catalysts Prepared in Examples 1–10:

| Catalyst of Example No. | $M_w$ [g/mol] |
| --- | --- |
| 1 | 2130 |
| 2 | 1970 |
| 3 | 1940 |
| 4 | 2180 |
| 5 | 2020 |
| 6 | 1920 |
| 7 | 1890 |
| 8 | 1910 |
| 9 | 1900 |
| 10 (Comparison) | 1310 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A double-metal cyanide catalyst comprising:
   a) at least one double-metal cyanide compound;
   b) at least one organic complexing ligand which is not a coronand; and
   c) at least one coronand.

2. The double-metal cyanide catalyst of claim 1, further comprising water and/or at least one water-soluble metal salt.

3. The double-metal cyanide catalyst of claim 1 in which the double-metal cyanide compound is zinc hexacyanocobaltate (III).

4. The double-metal cyanide catalyst of claim 1 in which the organic complexing ligand is an alcohol, aldehyde, ketone, ether, ester, amide, urea, nitrile, sulfide and/or a mixture thereof.

5. The double-metal cyanide catalyst of claim 1 in which the organic complexing ligand is tert.-butanol.

6. The double-metal cyanide catalyst of claim 1 in which the amount of coronand present in the double-metal cyanide catalyst is from about 1 to about 80 wt. %, based on the total weight of the double-metal cyanide catalyst.

7. A process for preparing the double-metal cyanide catalyst of claim 1, comprising:
   (a) reacting, in aqueous solution,
      (i) at least one metal salt,
      (ii) with at least one metal cyanide salt or the corresponding acid of the metal cyanide salt, in the presence of
      (iii) at least one organic complexing ligand which is not a coronand, to form a suspension; and
   (b) treating the suspension with at least one coronand.

8. The process of claim 7, further comprising:
   (c) isolating the double-metal cyanide catalyst from the suspension; and
   (d) washing the double-metal cyanide catalyst; and
   (e) drying the double-metal cyanide catalyst.

9. A process for preparing a polyether polyol by the polyaddition of an alkylene oxide onto a starter compound having active hydrogen atoms in the presence of a catalyst, the improvement wherein the catalyst comprises the double-metal cyanide catalyst of claim 1.

* * * * *